Jan. 22, 1924.

A. D. MAURY

AUTOMATIC FISHING REEL

Filed June 5, 1922

1,481,722

INVENTOR.
Alfred D. Maury,
BY
Thomas L. Wilder
ATTORNEY.

Patented Jan. 22, 1924.

1,481,722

UNITED STATES PATENT OFFICE.

ALFRED D. MAURY, OF ILION, NEW YORK, ASSIGNOR TO MARTIN AUTOMATIC FISHING REEL CO., INC., OF MOHAWK, NEW YORK, A CORPORATION OF NEW YORK.

AUTOMATIC FISHING REEL.

Application filed June 5, 1922. Serial No. 566,036.

*To all whom it may concern:*

Be it known that I, ALFRED D. MAURY, a citizen of the United States, residing at Ilion, in the county of Herkimer and State of New York, have invented certain new and useful Improvements in Automatic Fishing Reels, of which the following is a specification, reference being had therein to the accompanying drawing.

My invention relates to an automatic fishing reel and I declare the following to be a full, clear, concise and exact description thereof, sufficient to enable anyone skilled in the art to which it appertains to make and use the same reference being had to the accompanying drawings in which like reference characters refer to like parts throughout the specification.

The object of the invention is to provide a reel that will wind up an unusually long fish line, as for instance one of sixty or more feet. The invention is designed to improve one filed by me, June 14, 1921, and numbered serially 477,370. The object will be understood by referring to the drawings in which.

Figure 1:
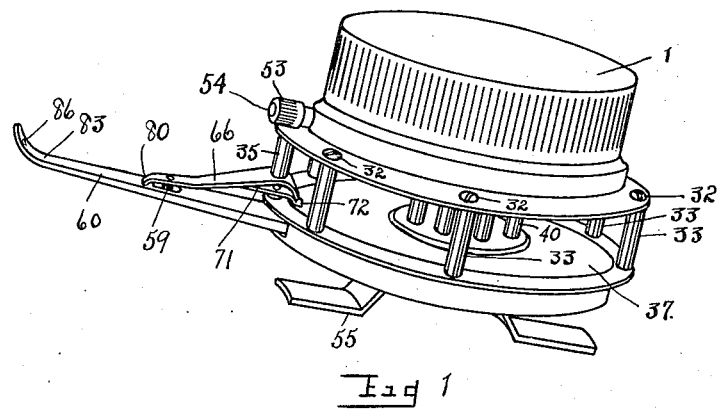
Fig. 1 is a perspective view of the automatic fishing reel.
Figure 2:
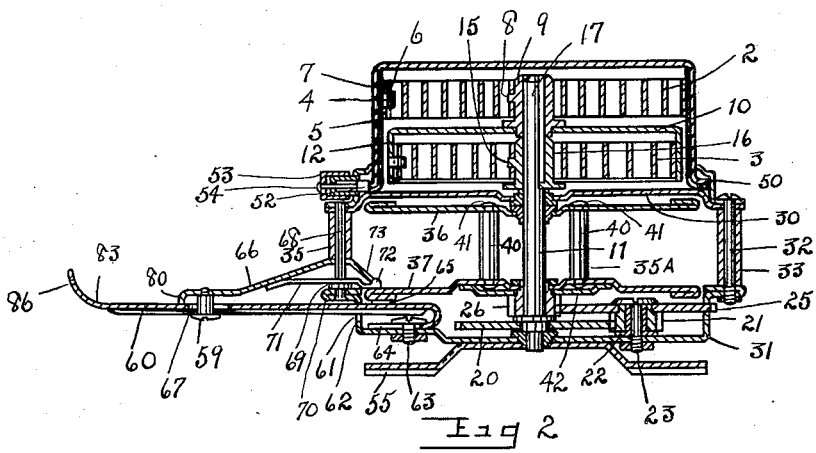
Fig. 2 is a central vertical section of the reel.

Referring more particularly to the drawings, the reel embodies a rotary drum 1 that encloses the main springs 2 and 3. One end of spring 2 is recessed to fit over the loop 4 formed on and projecting from the inner face of annular auxiliary casing 5 fixed to turn with drum 1. A pin 6 is adapted to hold the end 7 of spring 2 in place. The opposite end of spring 2 has a similar recess adapted to engage tooth 8 projecting from hub 9 that is mounted to turn with auxiliary drum 10. Hub 9 and drum 10 turn freely on spindle 11.

Within the space bounded by the lateral annular side 12 of drum 10, there is located spring 3, which has one end recessed to fit over loop 4ª formed on the inner surface of side 12. The opposite end of spring 3 engages a tooth 15 formed integral with hub 16. Hub 16 is broached or squared throughout about one eighth part of its length, whereby to co-operate with the milled or squared upper part 17 of spindle 11. Hub 16 is adapted to turn with spindle 11 as described in said application.

The lower end of spindle 11 has mounted to turn therewith a spur gear 20 adapted to mesh with pinion 21 which turns freely on sleeve 22 held in place by headed bolt 23. A spur gear 25 is mounted to the shouldered part of pinion 21 and is adapted to rotate with said pinion 21. Gear 25 meshes with pinion 26 mounted loosely to turn independently upon spindle 11.

Parts that are well known in the art embody the upper and lower plates 30 and 31 of the casing. Plates 30 and 31 are held mounted at the required distance apart by bolts 32 and spacing sleeves 33. Between plates 30 and 31 is located the rotary line spool 35ᴬ which has upper and lower disks 36 and 37 respectively, that are held in position by bolts 40 and rivets 41.

Lower disk 37 engages spider 42, whereby to rotate with said spider 42 which is adapted to turn with the upper reduced part of the hub pinion 26. Disk 37 is adapted to slip past spider 42 if abnormal tension is brought to bear, as when it is desired to reverse the rotation of spool 35. The train of gears and pinions just above described will increase the velocity of revolution of line spool 35ᴬ over that of the spindle 11 by a much greater velocity, whereby to cause the spool 35ᴬ to wind the fishing line, not shown, thereon in a comparatively short interval of time.

In order to tighten main springs 2 and 3, whereby they will effect a rotation of spindle 11, when released, the lower peripheral edge 50 of rotary drum 1 and the edge of auxiliary casing 5 fixed to turn with drum 1 are formed with ratchet teeth adapted to be engaged by a spring pressed pawl or dog 52. A sliding casing 53 is in engagement with the headed stem 54 of pawl 52, whereby to withdraw said pawl 52 from engagement with the ratchet teeth to release drum 1, if desired. The outer surface of drum 1 is milled or serrated to aid in turning the same. The usual reel seat 55 is attached to the lower plate 31 of the casing for the purpose of mounting the reel to a fishing pole, not shown.

Other parts that are described in the aforesaid application embody the brake adapted to stop the rotation of the line spool 35^A at the will of the fisherman, either when the fish is pulling the line out or when the main springs 2 and 3 are winding the same in. The brake embodies a lever 60 that projects through a recess 61 formed in the lateral wall 62 of lower plate 31. Said lever 60 is bent back upon itself and secured by a shouldered screw bolt 63, engaging an open adjustable recess 64 formed in the free edge of said bent end of lever 60, to lower plate 31. A leather pad or brake shoe 65 is firmly attached by glue or otherwise to the upper surface of lever 60 and is adapted to make frictional contact with the lower turned over edge of annular disk 37 of line spool 35^A.

A headed screw bolt 59 that is screw mounted to lever 66 projects through an elongated recess 67 formed in lever 60, whereby to rock lever 66 upon its fulcrum when lever 60 is rocked. The fulcrum comprises an upstanding pin 68 shouldered at 69 and riveted to rim 70 of plate 31, through which it projects. A shoe 71 is disposed beneath lever 66 and has an aperture for the projection therethrough of pin 68. The outer end of shoe 71 is bent at an angle, whereby to lie adjacent the under surface of lever 66. Its opposite end has upstanding ears 72—72 between which is disposed the inner end 73 of lever 66. The outer end of shoe 71 is adapted to aid in returning lever 66 to normal position, when forced down. The opposite end of shoe 71 forms a comparatively large bearing adapted to co-operate with brake shoe 65 in braking the rotation of spool 35^A. A spacing sleeve 35 is mounted to the upper part of pin 68. The inner end of lever 66 is adapted to rest upon the upper surface of brake shoe 71, whereby to press said shoe 71 directly opposite the location of brake shoe 65, which lies on the upper surface of lever 60, whereby the end of lever 66 and shoe 71 will co-operate with shoe 65 to form a clamp that will stop the rotation of the line spool 35^A at the will of the user.

The outer end of lever 66 is bent at an angle, as at 80, which is adapted to be projected temporarily into recess 67 formed in lever 60, when pressure is brought to bear at the outer end of lever 66, whereby to lock the brake thus formed by end 73 of lever 66, shoe 71, and brake shoe 65, in open position to permit the rotary line spool 35^A to turn freely in either direction as determined by the tension of main springs 2 and 3 or by the pull on the line in the opposite direction. A pressure on the outer end 83 of lever 60 will release the end 80 of lever 66 from recess 67, and, thereby, permit the brake to again operate.

In the event that the lever 60 is depressed too far, the shank of bolt 59 will abut against the end edge of recess 67 formed in lever 60 to arrest any further depression, which might, otherwise, damage the brake. Moreover, the end of the lever 71 that lies adjacent lever 66 will aid in preventing the abnormal depression of lever 60.

The extreme outer end of lever 60 has an aperture 86 adapted to provide a place for engaging the fish hook, not shown, temporarily, when not in use.

The operation of the reel is effected by first tying an end of the fishing line, not shown, around one of the bolts 40 of the line spool 35^A. The rotary drum 1 is wound then to tighten main springs 2 and 3. In winding reel drum 5 is turned, which causes main spring 2, fastened to turn with drum 5 to be wound. Inasmuch, as the inner end of spring 2 is fastened to hub 9, which is adapted to turn upon spindle 14 with auxiliary drum 10, the turning of drum 5 to wind spring 2 will also turn hub 9 and auxiliary drum 10 to wind main spring 3. Springs 2 and 3 being of the same length and the one winding the other, there will be a double winding capacity to the reel, which will be able to draw in an additional length of line over the ordinary reel.

After the main springs 2 and 3 have been wound thus, a slight pressure of the finger on the outer end 83 of lever 60 will release the brake formed by lever 66, shoe 71 and brake shoe 65. This will cause line spool 35^A to revolve to wind in the line, not shown, thereon.

While fishing, the free end of the line, not shown, will be carried by rings in a fishing pole, also not shown, and when a fish is caught, the fisherman will bring pressure to bear with his finger on the end 83 of lever 60 to allow the spool to rotate to wind in the line upon the spool. While the brake is released thus, the spool will be free to turn, in either direction, either by force of the main springs 2 and 3 or by a pull on the line in the opposite direction, in accordance with which force is the greater at the moment. This will give the fisherman opportunity to play the fish until the same becomes tired sufficiently to be pulled in and netted with a hand net. Should the user desire to lock the brake in open position, he will exert sufficient pressure upon the outer end of lever 66 to force the end 80 of lever 66 into recess 67 formed in lever 60, where it will remain until, thereafter released by a pressure on end 83 of lever 60. In this instance member 71 will aid lever 66 to return to its normal position.

Having thus described my invention what I claim as new and desire to secure by Letters Patent is:

1. In an automatic fishing reel, a rotary line spool, a spring for actuating the movements of said spool, a drum for tightening said spring, an auxiliary drum disposed within the first named drum, a spring located within said auxiliary drum, means for connecting said springs, whereby the force of said springs will co-operate to revolve said spool.

2. In an automatic fishing reel, a rotary line spool, a spring for actuating the rotation of said spool, a spindle adapted to connect said spring and spool, a second spring adapted to co-operate with the first named spring, whereby to increase the winding capacity of the spool, a lever carrying a pad, and a shoe adapted to co-operate with said pad, whereby to stop the rotation of the spool at the will of the user.

3. In an automatic fishing reel, a rotary line spool, a spring for actuating the movements of said spool, a drum for tightening said spring, an auxiliary drum disposed within the first named drum, a spring located within said auxiliary drum, and a hub for connecting said springs, whereby the force of said springs will co-operate to revolve said spool.

4. In an automatic fishing reel, a rotary line spool, a spring for actuating the movements of said spool, a drum for tightening said spring, an auxiliary drum disposed within the first named drum, a spring located within said auxiliary drum, means for connecting said springs, whereby the force of said springs will co-operate to revolve said spool, and locking means for permitting said spool to turn.

5. In an automatic fishing reel, a rotary line spool, a spring for actuating the movements of said spool, a drum for tightening said spring, an auxiliary drum disposed within the first named drum, a spring located within said auxiliary drum, means for connecting said springs, whereby the force of said springs will co-operate to revolve said spool, levers for braking the rotation of said spool, and means formed on said levers, whereby to lock them in given position to permit the rotation of the spool.

In testimony whereof I have affixed my signature.

ALFRED D. MAURY.